(12) United States Patent
Puglisi

(10) Patent No.: US 12,466,495 B2
(45) Date of Patent: Nov. 11, 2025

(54) HOOD FOR A MOTOR VEHICLE AND PROCESS FOR THE ASSEMBLING THEREOF

(71) Applicant: FERRARI S.P.A., Modena (IT)

(72) Inventor: Gabriele Puglisi, Modena (IT)

(73) Assignee: FERRARI S.P.A., Modena (IT)

( * ) Notice: Subject to any disclaimer, the term of this patent is extended or adjusted under 35 U.S.C. 154(b) by 373 days.

(21) Appl. No.: 18/152,348

(22) Filed: Jan. 10, 2023

(65) Prior Publication Data

US 2023/0219632 A1 Jul. 13, 2023

(30) Foreign Application Priority Data

Jan. 13, 2022 (IT) .......................... 102022000000434

(51) Int. Cl.
*B62D 25/10* (2006.01)
*B62D 25/12* (2006.01)
*B62D 65/06* (2006.01)

(52) U.S. Cl.
CPC ........... *B62D 25/12* (2013.01); *B62D 25/105* (2013.01); *B62D 65/06* (2013.01)

(58) Field of Classification Search
CPC ...... B62D 25/10; B62D 25/12; B62D 35/005; B62D 25/105; B60K 11/06
USPC ............. 296/193.11; 180/69.2, 69.24, 69.25
See application file for complete search history.

(56) References Cited

U.S. PATENT DOCUMENTS

| | | | | |
|---|---|---|---|---|
| 3,274,638 A | * | 9/1966 | Bien ...................... | E05B 83/24 16/86 A |
| 4,153,291 A | * | 5/1979 | Conti ........................ | B60J 9/00 446/470 |
| 4,629,022 A | * | 12/1986 | Wayne .................. | B60K 13/02 428/31 |
| 5,275,249 A | * | 1/1994 | Nelson .................. | B62D 25/12 180/69.2 |

(Continued)

OTHER PUBLICATIONS

Autocar: "Ferrari 812 Competizione Review 819 bhp, 450,000 Limited Edition Track Tested, Autocar," XP055956110, Retrieved from the Internet: URL: https://www.youtube.com/watch?v=84jRolWaot4, retrieved on Aug. 30, 2022, 3 pages.

(Continued)

*Primary Examiner* — Gregory A Blankenship
(74) *Attorney, Agent, or Firm* — CANTOR COLBURN LLP

(57) ABSTRACT

A hood for a motor vehicle includes a framework base having a length extension along a first axis and a width extension along a second axis orthogonal to the first axis, a covering panel for at least partially covering a portion of the framework base, and fixing means for fixing the covering panel to said portion, such that the covering panel at least partially covers the portion, the fixing means being provided with a base element carried by the covering panel in a fixed position relative to the covering panel, and a register element coupled to the base element in a movable manner along a third axis transverse to a plane comprising the first and the second axis, wherein the register element has an end that is farther from the base element along the third axis and faces the framework base, the end being adapted to abut against the framework base along the third axis.

12 Claims, 3 Drawing Sheets

(56) References Cited

U.S. PATENT DOCUMENTS

| | | | | |
|---|---|---|---|---|
| 5,950,753 | A * | 9/1999 | Muldoon | B60K 11/00 |
| | | | | 180/69.2 |
| 7,788,860 | B2 * | 9/2010 | Bartman | E04F 13/0814 |
| | | | | 52/506.05 |
| 8,616,622 | B2 * | 12/2013 | Davis | E05F 5/022 |
| | | | | 296/193.11 |
| 9,889,890 | B1 * | 2/2018 | Manginen | B62D 25/12 |
| 2012/0280537 | A1 * | 11/2012 | Quirk | B62D 25/10 |
| | | | | 296/193.11 |
| 2023/0219631 | A1 * | 7/2023 | Puglisi | B62D 29/005 |
| | | | | 296/193.11 |
| 2023/0219632 | A1 * | 7/2023 | Puglisi | B62D 25/12 |
| | | | | 296/193.11 |

OTHER PUBLICATIONS

Ferrari Press Office: "812 Competizione and 812 Competizione A: Two Interpretations of Ferrari's Racing Soul," XP055956137, Retrieved from the Internet: URL: https://www.ferrari.com/en-EN/corporate/articles/812-competizione-and-812-competizione-a-two-interpretations-of-ferraris-racing-soul; May 5, 2021, pp. 1-9.

Italian Search Report for Application No. 102022000000434; Filing Date—Jan. 13, 2022; Date of Mailing—Aug. 30, 2022, 6 pages.

* cited by examiner

HOOD FOR A MOTOR VEHICLE AND PROCESS FOR THE ASSEMBLING THEREOF

CROSS-REFERENCE TO RELATED APPLICATIONS

This patent application claims priority from Italian patent application no. 102022000000434 filed on Jan. 13, 2022 the entire disclosure of which is incorporated herein by reference.

TECHNICAL FIELD

The invention relates to a hood for a motor vehicle, in particular a sports car, as well as a process for assembling the hood.

PRIOR ART

As known, a motor vehicle includes a body, which comprises the more external parts of the motor vehicle and, therefore, those visible to the user. These parts typically also include the hoods, i.e., the hatches arranged respectively to cover an engine compartment and a trunk of the motor vehicle.

In general, there is an aesthetic need to cover hoods with finishing elements, such as panels made of carbon fire with a wing shape, although these do not have a specific aerodynamic function.

In particular, there is a need to cover a central area of a hood with one of the above-mentioned panels.

This introduces technical difficulties linked both to the complex position of the panel for fixing by operators, and to the precision of fixing for the purpose of complying with the determining aesthetic constraints for the commercial success of the hood.

One purpose of the invention is to reduce or mitigate the technical difficulties introduced.

DESCRIPTION OF THE INVENTION

The purpose is achieved with a hood according to claim 1.

The dependent claims define particular embodiments of the invention.

BRIEF DESCRIPTION OF THE DRAWINGS

Below, an embodiment of the invention will be described to better understand the same by way of non-limiting example and with reference to the attached drawings in which.

EMBODIMENTS OF THE INVENTION

Figure 1:
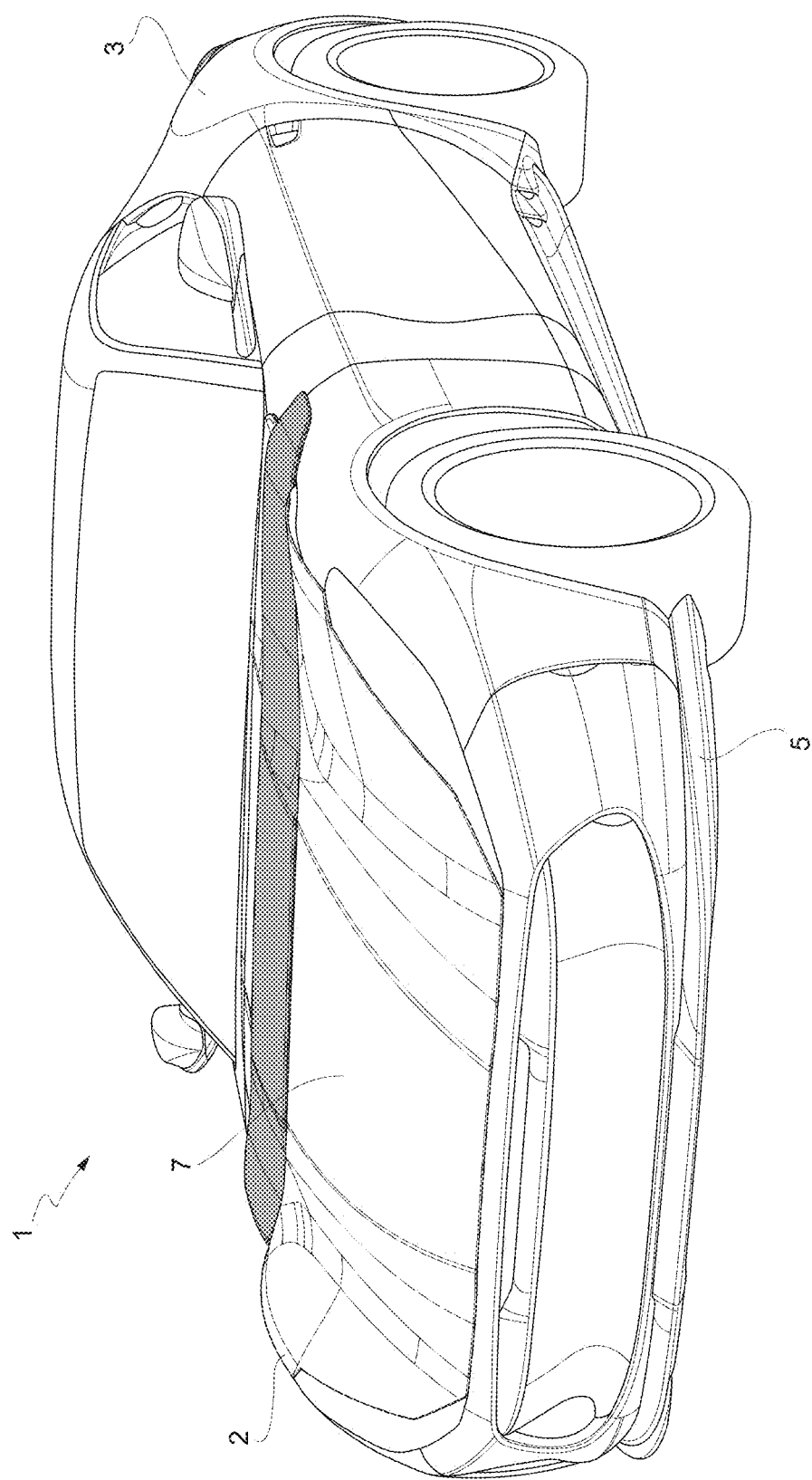
FIG. 1 is a perspective view of a motor vehicle that comprises a hood according to the invention.

In FIG. 1, the reference number 1 is used to indicate, as a whole, a motor vehicle.

Figure 2:
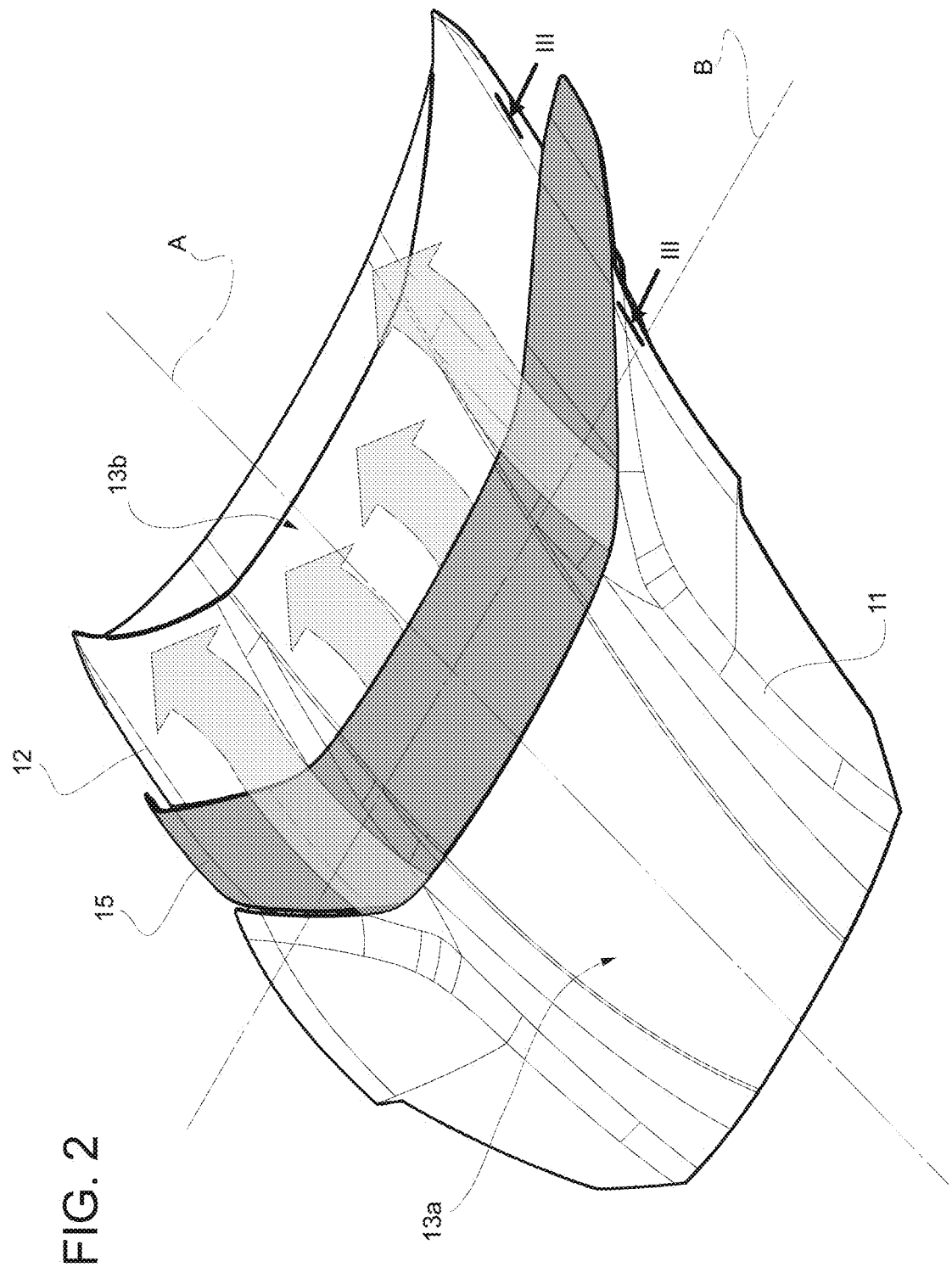
FIG. 2 is a perspective view, on an enlarged scale, of the hood of the motor vehicle in FIG. 1.

The motor vehicle 1 has a front part 2 and a rear part 3, according to its moving direction, represented in FIG. 2 via a straight longitudinal axis A.

In addition, the motor vehicle 1 comprises a body 5 and a hood 7, in particular a front hood at the front part 2. The hood 7 is mounted on the body 5.

The hood 7 covers or closes an engine compartment that is not illustrated, which houses a known engine that is also not illustrated.

Alternatively, the hood 7 could also have been a rear hood and/or hood covering the trunk.

The hood 7 comprises a framework base or skeleton 8 (FIG. 3), which has a length extension along the axis A and a width extension along an axis B orthogonal to the axis A. The axes A and B belong to a plane, horizontal in use. Therefore, in use, the axes A and B are horizontal. As already mentioned above, the axis A coincides with the moving direction of the motor vehicle 1.

The framework base 8 has two opposite ends 9, 10 along the axis A. The end 9 is the end more at the front, i.e., it belongs to a front end of the motor vehicle 1.

In addition, the hood 7 comprises two covering panels 11, 12 fixed to the framework base 8 so as to cover, respectively, the ends 9, 10, for the entire width extension of the framework base 8.

In more detail, the covering panels 11, 12 are, respectively fixed, in particular seamed, to structural elements with channels not illustrated.

The covering panels 11, 12 define respective outer surfaces 13a, 13b of the hood 7. The outer surfaces 13a, 13b are defined on one side opposite the framework base 8. In other words, the outer surfaces 13a, 13b face the outside of the motor vehicle 1.

In particular, the covering panels 11, 12 are sheets made of metal, for example sheets comprising or made of aluminium.

The covering panels 11, 12 leave an intermediate portion 14 of the framework base 8 uncovered; the intermediate portion 14 is arranged between the ends 9, 10, according to the axis A.

In particular, the intermediate portion 14 is left uncovered by the covering panels 11, 12 for the entire width extension of the framework base 8.

This does not mean that the intermediate portion 14 is not covered in part or entirely using other elements, devices, structures, panels, or the like, but simply that the panels 11, 12 do not cover the intermediate portion 14.

In fact, the hood 7 comprises a covering panel 15 fixed to the framework base 8 so as to at least partially cover the intermediate portion 14. In more detail, the covering panel 15 covers only part of the intermediate portion 14.

Here and below, the expression "to cover" is intended as a synonym for "to coat". In the use context of the motor vehicle 1, covering may be understood to mean positioned above. The expression "use context" of the motor vehicle 1 is here and below used to identify a condition wherein the hood 7 is mounted on the body 5.

The covering panel 15 has a wing shape.

The covering panel 15 preferably comprises or is made of carbon fibre. The covering panel 15 has, for the most part, the mere function of covering; in particular, notwithstanding the wing shape, the covering panel 15 is not suitable for generating downforce.

To fix the covering panel 15 to the framework base 8, the hood 7 comprises a fixing device 20 that will be described in detail below.

The fixing device 20 comprises a base element 21, which is carried by the covering panel 15 in a fixed position relative to the latter.

In more detail, the base element 21 is integrated with the covering panel 15. In detail, the base element 21 is embedded in the carbon fibre or glued to the covering panel 15.

The fixing device 20 also comprises a register element 22 coupled to the base element 21 in a movable manner relative to the base element 21 along an axis Z transversal and, more precisely, orthogonal, to a plane comprising the axes A, B.

In the use context of the motor vehicle 1, the axis Z is vertical. In addition, the covering panel 15 is arranged above the framework base 8.

More precisely, the register element 22 has two degrees of freedom of movement in relation to the base element 21 to which it is attached. A first degree of freedom is that already mentioned, i.e., a degree of freedom of translation along the axis Z. A second degree of freedom is a degree of freedom of rotation around the axis Z. The register element 22 does not have other degrees of freedom of movement relative to the base element 21.

In other words, the register element 22 is fixed to the base element 21 according to directions that are radial to the axis Z.

Figures 3, 4:
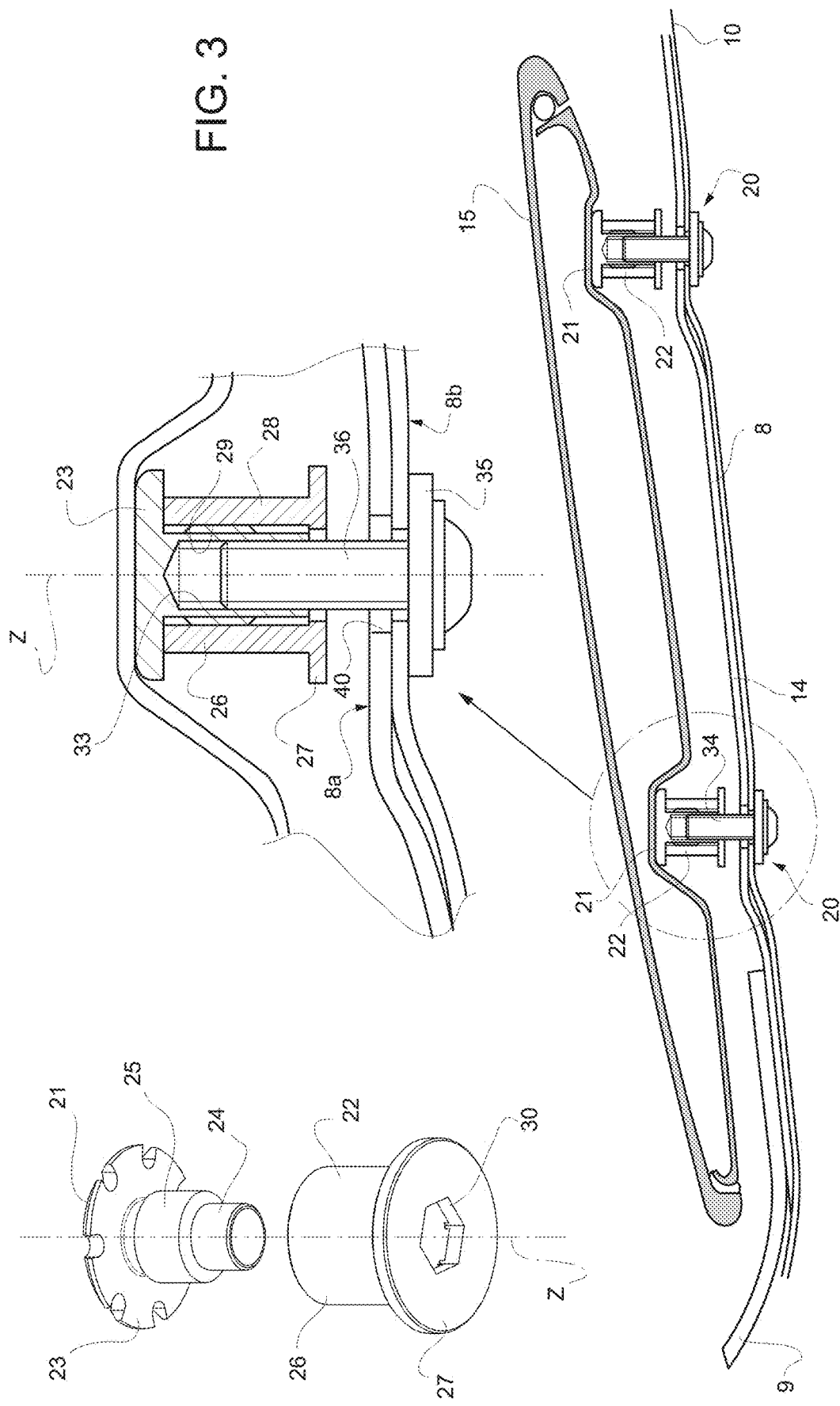
FIG. 3 is a cross-section of the hood according to a plane indicated in FIG. 2 by a cross-section line III-III.
FIG. 4 is an exploded view of a device for fixing a covering panel to a framework base of the hood.

In the embodiment in FIGS. 3 and 4, the base element 21 comprises a base portion 23, in particular comprising a disc, and a pin or rod 24 extending along the axis Z from the base portion 23.

The disc of the base portion 23 is, specifically, glued to the covering panel 15.

The pin 24 comprises an externally threaded portion or external threading 25, which has, in particular, a diameter that is greater than the rest of the pin 24. More specifically, the external threading 25 corresponds to an intermediate portion of the pin 24.

Specifically, the pin 24 projects directly from the disc of the base portion 23, even if this is not necessary.

The register element 22 extends along the axis Z between two ends 26, 27 respectively closer to and further from the base portion 23, according to the axis Z.

The end 27 faces towards the framework base 8 and is designed to abut against the framework base 8 along the third axis 8.

In more detail, the end 27 comprises a flat wall, in particular a cylindrical one, around the axis Z.

The register element 22 preferably comprises, in addition, a sleeve 28 arranged along or around the axis Z, i.e., coaxial to the pin 24.

The sleeve 28 is arranged around the pin 24; in other words, the pin 24 is radially internal to the sleeve 28.

In particular, the sleeve 28 comprises the end 26. More specifically, the register element 22 consists of the sleeve 28 and the end 27.

In detail, the end 27 radially projects relative to the sleeve 28. In other, more detailed words, the flat wall has a diameter that is greater than the outside diameter of the sleeve 28.

The sleeve 28 comprises an internally threaded portion or internal threading 29, which is coupled to the external threading 25.

Thus, the register element 22 is mobile in relation to the base element 21 for screwing or unscrewing the sleeve 28 in relation to the pin 24, i.e., of the external threading 25 in relation to the internal threading 29.

Thus, the sleeve 28 rotates around the axis Z and, at the same time, translates along the axis Z, according to the screw-nut principle.

Although this is advantageous, some variants may, in any case, be considered; for example, the sleeve 28 could be coupled to the pin 24 so as to slide along the axis Z with an elastic member coupled to the sleeve 28 and to the base element 21 between them.

The end 27 preferably comprises a polygonal hole 30, more precisely a polygonal through hole, which extends along the axis Z and is, therefore, coaxial, in detail, to the sleeve 28 or to the pin 24.

The hole 30 passes, in particular, through the flat wall of the end 27 and is positioned, in more detail, at the centre of the flat wall.

In detail, the hole 30 has a radial extension that is smaller than an internal diameter of the sleeve 28.

Independently, the radial extension of the hole 30 is greater than an external diameter of the pin 24.

The hole 30, precisely, is hexagonal.

The hole 30 is shaped to insert a wrench (not illustrated) designed to allow the screwing or unscrewing of the sleeve 28 in relation to the pin 24. The wrench is an Allen wrench in this case.

Thus, an operator can move the register element 22 along the axis Z by using the wrench.

The movement along the axis Z of the register element 22 is limited on one side by the base portion 23, with which the end 26 may enter into contact and, on the other, by the framework base 8 or, more precisely, by a face 8a thereof, against which the end 27 abuts.

The face 8a faces towards the register element 22 or towards the covering panel 15. The framework base 8 also has a face 8b opposite the face 8a.

The framework base 8 has a through hole 40 along or around the axis Z, more precisely between the faces 8a, 8b for the passage of the wrench, since the operator can move the sleeve 28 through the framework base 8.

The hole 40 may be considered part of the fixing device 20.

In the embodiment in FIG. 3, the pin 24 has a threaded hole 33 around or along the axis Z. Thus, the hole 33 is coaxial to any of the following: the sleeve 28, the pin 24, the hole 30, the other hole 40, or the flat wall of the end 27. In particular, the hole 33 is a blind hole.

The fixing device 20 also comprises a screw 34 that crosses the hole 40 and is screwed into the hole 33, in this case in a piercing manner. The screw 34 extends along the axis Z.

The screw 34 has a head 35 and a threaded shank 36 that extends from the head 35 along the axis Z.

The threaded shank 36 passes through the hole 40, in detail with radial clearance. In this way, by radially moving the screw 34 inside the hole 40, the position of the covering panel 15 can be adjusted according to the axes A, B.

The position of the covering panel 15, according to the axis Z, may be adjusted by moving the register element 22.

The head 35 is tightened to the outside of the hole 40 on the face 8b and, thus, on the framework base 8. The expression "tightened" includes both the meaning of directly tightened and the meaning of indirectly tightened, for example since one or more washers may be provided between the head 35 and the framework base 8.

The position of the covering panel 15 is implemented as soon as the head 35 is tightened on the face 8b, or on the framework base 8.

As can be seen in FIG. 3, the hood 7 may comprise more than one fixing device 20; in this case, the hood 7 comprises four fixing devices 20, of which two are visible in FIG. 3.

A process for mounting the hood 7 may be, therefore, the following.

The covering panel 15 is positioned in a desired position relative with respect to the framework base 8.

The covering panel 15 may be kept in the desired position, relative to the framework base 8, via special supports that can be removed (not illustrated) during the whole process.

Thus, the register element 22 is moved along the axis Z towards the framework base 8 while the desired position is maintained. The register element 22 is moved until the end 27 is brought to abut against the face 8*a*, or against the framework base 8.

Thus, the covering panel 15 is rested on the framework base 8 in the desired position, for which the removable supports could even be, potentially, already removed.

As already mentioned above, the movement of the register element 22 is obtained by screwing or unscrewing the sleeve 28 to the or from the pin 24, in particular using a wrench inserted through the hole 30.

At this point, the desired position may be stabilised or fixed.

Thus, the covering panel 15 is fixed to the framework base 8 in the desired position.

The fixing occurs by inserting the screw 34 along the axis Z through the hole 40 and screwing the screw 34 on the threaded hole 33, until tightening the head 35 to the outside of the hole 40 on the face 8*b* or, more generally, on the framework base 8.

The covering panel 15 is fixed to the framework base 8 when the head 35 is tightened to the framework base 8.

Here, the mounting process is concluded; the hood 7 can, thus, be mounted on the body 5 during assembly of the motor vehicle 1.

From the above, the advantages of the hood 7 and the process according to the invention are clear.

The covering panel 15 can be fixed to the framework base 8 in an extremely simple and convenient way for the operator, using just a few simple and effective devices.

In fact, the operator accesses the register element 22 via the hole 40 from below the hood 7, while the latter is supported up high, for example via a straightening bench.

The operations that the operator must undertake to fix the covering panel 15 are simple and few in number.

In addition, the adjustment and fixing of the desired position relative to the axis Z may occur in an extremely precise way, in particular thanks to the external threading 25 and the internal threading 29 coupled together, especially when the pitch is tightened.

The greater width of the hole 40 in relation to the shank 36 of the screw 34 makes it possible, in addition, to adjust the desired position according to the axes A, B, in a very simple way.

In fact, the fixing of the desired position is completely obtained, according to the three axes A, B, Z, when the head 35 is tightened to the framework base 8.

Finally, it is clear that changes may be made to the hood 7 according to the invention, and variations produced thereof, that, in any case, do not depart from the scope of protection defined by the claims.

For example, the number or shape of the components described and illustrated could vary, without any loss of generality.

The invention claimed is:

1. A hood for a motor vehicle, the hood being configured to be mounted on a body of the motor vehicle and comprising a framework base having a length extension along a first axis and a width extension along a second axis orthogonal to the first axis, a covering panel for at least partially covering a portion of the framework base, and fixing means for fixing the covering panel to said portion, such that the covering panel at least partially covers the portion, the fixing means comprising a base element carried by the covering panel in a fixed position relative to the covering panel, wherein the fixing means further comprise a register element coupled to the base element in a movable manner relative to the base element along a third axis transversal to a plane comprising the first and the second axes, wherein the register element extends along the third axis between first and second ends, wherein the first end is closer to the base portion and the second end is farther from the base portion and faces the framework base, the second end being adapted to abut against the framework base along the third axis.

2. The hood according to claim 1, wherein the base element comprises a base portion and a pin extending along the third axis of the base portion and comprising an externally threaded portion, the register element comprising a sleeve arranged along the third axis between the base portion and said second end and comprising an internally threaded portion coupled to the externally threaded portion.

3. The hood according to claim 2, wherein said second end comprises a polygonal hole around the third axis for the insertion of a wrench adapted to screw or unscrew the internally threaded portion to or from the externally threaded position.

4. The hood according to claim 2, wherein the pin has a threaded hole around the third axis.

5. The hood according to claim 4, wherein the fixing means further comprise a through hole obtained on the framework base around the third axis and a screw going through the through hole and screwed into the threaded hole, the screw having a head tightened on the outside of the through hole on a first face of the framework base opposite to a second face of the framework base, the second face facing the register element.

6. A process for assembling a hood according to claim 1, the process comprising the steps of placing the covering panel in a relative position with respect to the framework base, moving the register element along the third axis towards the framework base keeping said relative position until the second end of the register element abuts against the framework base, thereby laying the covering panel on the framework base, and fixing the covering panel to the framework base in said relative position.

7. The process according to claim 6, wherein the step of moving the register element comprises the step of screwing or unscrewing an internally threaded sleeve of the register element to or from an externally threaded pin, the pin being part of the base element and extending along the third axis from a base portion of the base element.

8. The process according to claim 7, wherein the step of screwing or unscrewing the sleeve takes place by means of a wrench inserted through a polygonal hole of the second end of the register element around the third axis.

9. The process according to claim 6, wherein the step of fixing the covering panel comprises the steps of inserting a wrench along the third axis through a through hole made in the framework base, screwing the screw into a threaded hole made in the pin along the third axis, tightening a head of the screw on the outside of the through hole on a first face of the framework base opposite to a second face of the framework base, the second face facing the register element, thereby fixing the covering panel to the framework base.

10. A motor vehicle comprising a body and a hood according to claim 1, the hood being mounted on the body with the first axis coinciding with the moving direction of the motor vehicle.

11. The hood according to claim 1, wherein the first end is configured to contact one side of the base portion upon movement of the register element along the third axis, and wherein the second end is configured to abut a first face of the framework base upon movement of the register element along the third axis.

12. The process for assembling a hood according to claim 6, wherein the first end is configured to contact one side of the base portion upon movement of the register element along the third axis, and wherein the second end is configured to abut a first face of the framework base upon movement of the register element along the third axis.

* * * * *